Oct. 12, 1948.  A. L. BAKER ET AL  2,451,146
INTERNALLY INSULATION LINED VESSEL
Filed June 5, 1944
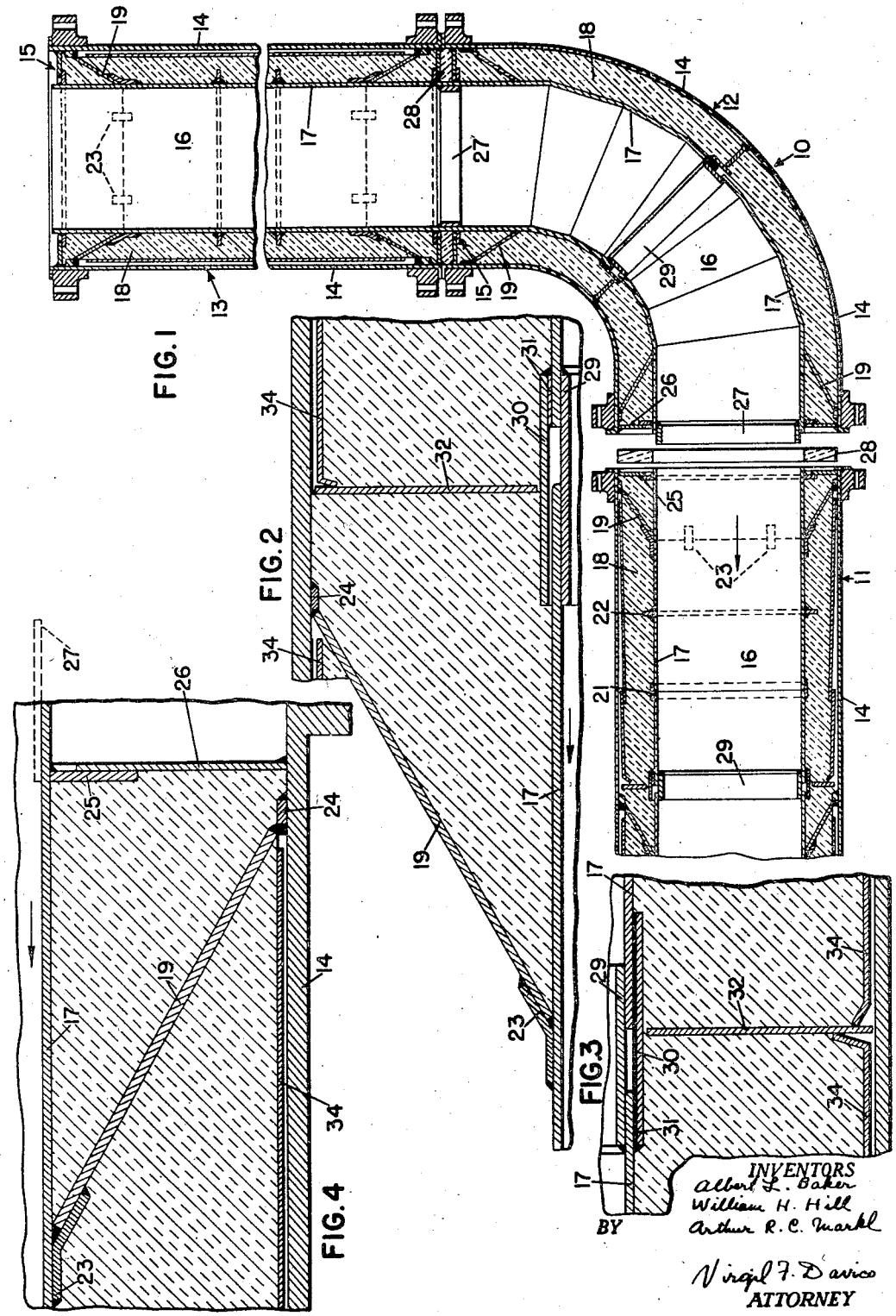
INVENTORS
Albert L. Baker
William H. Hill
Arthur R. C. Markl
BY
Virgil F. Davico
ATTORNEY

Patented Oct. 12, 1948

2,451,146

UNITED STATES PATENT OFFICE 2,451,146

INTERNALLY INSULATION LINED VESSEL

Albert L. Baker, Summit, William H. Hill, Pennington, and Arthur R. C. Markl, Teaneck, N. J., assignors to The M. W. Kellogg Company, New York, N. Y., a corporation of Delaware Application June 5, 1944, Serial No. 538,854

13 Claims. (Cl. 138—64)

This invention relates to internally insulated vessels designed to handle materials at high temperatures.

It is now quite usual to provide vessels for handling materials at temperatures well above the temperature range within which carbon steel is a satisfactory material of construction and its characteristics and properties are well known. Satisfactory vessels for this class of service may be made of alloy steels of various analyses, which usually include molybdenum. Vessels so made are expensive since the high creep-strength alloys are themselves expensive and are difficult to fabricate. Also, the high creep-strength alloys require special heat treatment to develop their special properties. Furthermore, maintenance and repair of such vessels is difficult and costly.

It has been proposed to obviate the use of the high creep strength alloys by providing a heat insulation lining against the inner walls of the vessels and thereby reduce the temperature of the vessel walls to the range in which carbon steel is fully satisfactory. This proposal has gone into extensive commercial use.

Internal insulation linings, in order to properly serve their purpose, must be so constructed and arranged that their insulating value remains unimpaired in service. One of the main causes for lessening of the insulation value of the linings in service is the flow of the material handled through the space occupied by the insulation component of the lining. If this flow becomes appreciable, the vessel walls may attain temperatures approaching that of the material handled so that the value of the lining will be materially reduced and in extreme cases entirely lost. Also, appreciable flow of the material particularly when the material is condensable or corrosive causes rapid deterioration of the insulation component.

The invention particularly concerns a novel internal insulation lining which, while of general application, is especially suited for application to vessels designed to handle flowing materials at highly elevated temperatures.

It is a primary object of the invention to provide a novel insulation lining adapted to be disposed against the inner wall of a vessel designed to handle materials at elevated temperatures, which, while it allows ready equalization of pressure between the space occupied by the insulation component and the space occupied by the material handled, prevents substantial flow of the material handled from a region at a higher pressure to another at a lower pressure through the space occupied by the insulation component.

It is also a primary object of the invention to provide a novel insulation lining of the character mentioned, formed of one or more sections, which are supported from the vessel wall in such a manner that regardless of the angular disposition of the vessel substantially all of the weight of each section is carried by its support. The support employed is such that while one end of each section is securely anchored to the vessel wall the section is free to expand both radially and longitudinally wtihout substantial restraint. The support employed is also such that a minimum continuous metallic path for heat is provided between the material handled and the vessel wall. The support employed, furthermore, is such that it acts as a damper of vibrations set up when the material handled flows at high velocities.

It is a further important object of the invention to provide a novel insulation lining, of the character mentioned, formed of one or more sections each of which includes an insulation component and a metal liner component, the metal liner component of each section having one end anchored to the vessel walls by an impervious member of frusto-conical or frusto-pyramidal form, depending on the cross-sectional shape of the vessel, that is united to the metal liner section and the vessel walls, the other end of the metal liner section being free whereby said metal liner section is supported from the vessel walls while it is substantially unrestrained against radial and longitudinal expansion and contraction.

The above, as well as the further objects and features of the invention, will be better understood from a consideration of the following description of a present preferred embodiment of the invention taken with the accompanying drawings, in which, Fig. 1 is a fragmentary longitudinal section of a vessel lined in accordance with the invention, and Figs. 2, 3, and 4 are fargmentary sectional views illustrating, on an enlarged scale, details of the structure of Fig. 1.

The novel internal insulating lining of the invention is of general application and may be applied to vessels, pipes, containers, conduits and the like that are used for handling, storing, processing or flowing solids, gases, vapors or mixtures thereof. Hereinafter, the term "vessel" will be used to indicate and to include all forms of apparatus to which the novel lining will be applied. The novel internal insulating lining of the invention may be applied to vessels of any size or shape and is formed to conform to the internal shape of the vessel. Since it is more usual to line vessels having a generally circular transverse cross-section, the invention will be described and claimed in connection with such vessels without intention, however, of limiting it to such vessels.

While, as stated, the vessels lined may be of any size, large vessels and small vessels will hereinafter be separately considered. A large vessel will be taken as one of sufficient internal diameter to permit a man to enter to perform work therein and a small vessel will be taken as one that is too small in diameter to permit such man access.

While the vessels to which the lining of the invention is applied will usually handle materials at elevated temperatures and generally also at elevated pressure, the invention is not limited to vessels handling high temperature materials as, obviously, the novel lining is useful even at very low temperatures. Thus, the novel lining may beneficially be used to line vessels handling compressed gases at temperatures in the range in which carbon steel is not satisfactory because of its low shock resistance, so that by reason of the novel lining the temperature of the vessel walls can be kept above said range.

Vessel 10 will be considered to include a horizontal leg 11, an elbow 12 and a vertical leg 13. The joint between leg 11 and elbow 12 is shown as open to better illustrate the construction while that between elbow 12 and leg 13 is shown as closed and ready for operation. The walls 14 of conduit 10 are preferably, though not necessarily, made of carbon steel. The material handled may, for example, be high pressure steam at 1500° F. The walls 14 are kept at temperatures not substantially above 650° F. by means of insulation lining 15 that internally covers the walls 14 of vessel 10.

Insulation lining 15 is made up of a plurality of sections 16 each of which includes a metal liner element 17 disposed concentrically relative to the walls 14 and spaced therefrom by a distance sufficient to accommodate the depth of insulation material 18 required to provide the required temperature difference between the material flowing through the central space of liner element 17 and the walls 14. Each section of liner element 17 is supported from wall 14 by a generally frusto-conical member 19 that has its smaller end united to the section of liner element 17 adjacent one end thereof and the larger end united to the walls 14 of vessel 10. The unsupported end of each liner element 17 and the contiguous end of the adjacent liner element 17 are arranged to form an expansion joint, shown in detail in Figs. 2 and 3, which permits longitudinal movement of the contiguous ends of adjacent liner elements 17 while these ends are maintained in alignment. The expansion joint is such, furthermore, that sufficient provision for equalization of pressure is afforded.

Metal liner element 17 may be made of any metal suitable for the service. For the high temperature service above-mentioned, chrome-steel is found suitable. The sections of liner element 17, and consequently section 16, may be of various lengths as required by the length of the vessel. The section of liner element 17 will generally be made of one or more parts of a length equal to the width or the length of the chosen commercial sheets of the preferred metal. When the sections of liner element 17 are made of two or more parts, the abutting edges of the parts are joined together by a circumferential weld which is backed by a backing ring 21. Backing ring 21 is also welded along its edges to the parts it backs and, aside from strengthening the joint, strengthens the liner element 17 against collapse. Stiffener rings 22 are united to the sections of liner element 17 to stiffen them and reenforce them against collapse. Rings 22 are preferably positioned intermediate the reenforced portions of the sections of liner element 17.

Insulation material 18 may be of any preferred kind and character suited to the service. At present, it is preferred to use insulation in block form for all portions of insulation 18 except those portions that require packing during assembly because of the ease in handling and positioning. A block insulation made up of amosite asbestos, diatomaceous earth and a suitable binder has been found entirely satisfactory in the service mentioned above.

The sections 16 are so arranged that the frusto-conical rings 19 of the end sections 16 are located proximate their respective ends of the section of vessel 10 so as to facilitate welding and to provide for better control of expansion. The end construction is best shown in Fig. 4. As shown in this figure, the small end of ring 19 is welded directly to the wall of the section of liner element 17. The joint between ring 19 and element 17 is reenforced at intervals by the provision of a plurality of spaced angular tabs 23 that are welded to element 17 and to ring 19. Adjacent the end of vessel 11 is welded a ring 24 to which, as well as to the walls 14, is welded the large end of frusto-conical ring 19. This construction facilitates assembly as out-of-roundness of the vessel or of the conical ring may be easily accommodated. When there is no out-of-roundness ring 24 may be dispensed with. Thus, ring 19 presents an impermeable barrier to the flow of the material handled. A stiffener ring 25 is united to the section of liner element 17 adjacent the end thereof. A closure ring 26 of light gage metal, usually of carbon steel, is united to wall 14 to cooperate with ring 25 to prevent passage of the material handled into the space between ring 19 and the end of liner element 17 while permitting pressure equalization. The space between ring 19, the end of liner element 17 and rings 25 and 26 is hand packed with loose insulation having the same general properties as the bulk of the insulation 18. A lap ring 27 is welded to the end of the section of the liner element 17 at the downstream end of one of the sections of vessel 10 so that it will overlap the end of the section of liner element 17 at the upstream end of the abutting section. Lap ring 27 serves to cover the joint between the abutting sections of liner element 17 and thus, provides for smooth flow of the material handled while at the same time preventing flow of the material handled into the joint. Lap ring 27, however, amply provides for pressure equalization. In making up the joint between sections of vessel 10 an insulation washer 28 is positioned between rings 26 to fill the space between them.

The construction employed when ring 19 is contiguous to an expansion joint is best shown in Fig. 2. Ring 19 is attached in the same manner as in Fig. 4. The expansion joint is formed by a lap ring 29, similar to lap ring 27, united to the inner face and a lap ring 30 united to the outer face of the downstream end of the abutting sections of liner element 17. Lap ring 30 is spaced from the face of liner element 17 by a filler ring 31 to provide ample room for relative movement of the ends of the abutting sections of liner element 17. Lap ring 29 closes the joint to the material handled but the fit is such that pressure equalization may readily take place. The space between ring 19 and the end of its section of liner element 17 is hand packed with loose insulation. A centralizing ring 32 is placed against the hand packed loose insulation. Ring 32 is loose and is united to neither wall 14 nor liner element 17 so that it will not move with either during expansion and contraction and consequently, will not pack the loose insulation or form voids therein. Ring 32 is used primarily as a centralizer to hold and support the liner concentric with the vessel when the liner is exposed to extremely high temperatures. In Fig. 3 is shown the expansion joint, just described, as formed between two free ends of sections of liner element 17.

With large vessels 10, the sections 16 of the liner are preferably assembled and packed with insulation externally of vessel 10 and then individually positioned and united to the walls 14, although under special conditions, for instance, when fabricating elbow section 12, the liner sections may be packed in their ultimate position in vessel 10. In order to make it possible to handle sections 16 after they are packed with block insulating material 18, a light gage carbon steel jacket 34 is provided around each of them. Jackets 34, in one or more sections, extend from the large end of ring 19 to substantially the end of the block insulation 18 at the free end of the section of liner element 17. When a section 16 is packed externally of vessel 10 the space between frusto-conical ring 19 and the end portion of liner element 17 is left unpacked until after the section is put in position and frusto-conical ring 19 is united to the walls 14 of vessel 10. Also, closure rings 26 are not positioned and welded until the welding of frusto-conical ring 19 and the packing of the loose insulation material.

In assembling the packed sections 16 to form the internal heat insulation lining for vessel 10 and, taking for instance the assembling of the lining in vertical leg 13, the bottom section 16 is moved into vertical leg 13 until the large end of frusto-conical ring 19 attains the position shown in Fig. 4. Cone ring 24 is then positioned and welded after which frusto-conical ring 19 is welded to cone ring 24 and walls 14 as shown. The space between frusto-conical ring 19 and the section of lining element 17 is then packed with loose insulation material and the end of the section closed by welding closure ring 26 to vessel wall 14. Centralizing ring 32 is then placed on the projecting free end of the positioned section 16 and the next section 16 lowered into position. Ring 19 is welded and the end of the section packed and finished as before. Generally, it is preferred to position the sections without rings 29 united thereto as that makes spacing of the section ends, required to permit longitudinal movement due to expansion, a simple matter. Rings 29 may then be positioned and welded after all of the lining sections have been positioned in the vessel.

This procedure is repeated until the whole of the leg is lined. It will be noted that the lining sections 16 are always so chosen as to length that a frusto-conical ring 19 is welded at each flange end of the section of the vessel 10.

In assembling the insulation lining within elbow 12 or vessels or other than straight cylindrical shapes, the lining sections can seldom be assembled externally of the vessel but must be assembled within the vessel. In the case of elbow 12 the liner element 17 may be made up of two sections. Each section of liner element 17 may be fabricated from smaller mitered sections, and backing rings 21 and stiffener rings 22 may be employed when necessary, but such rings have not been shown on the elbow sections of liner 17 of Fig. 1. After the sections of liner element 17 have been assembled some of the block insulation 18 may be applied to their outer surfaces, care being taken that the insulation material applied does not prevent insertion of the sections into position or welding of rings 19 to the liner sections. Centralizing ring 32 is then positioned adjacent the situs of the expansion joint between the sections of liner 17. Since at this stage the sections of liner 17 are not as yet within elbow 12 it will usually be found expedient to tack or otherwise weld ring 32 in position. The sections of liner element 17 are then positioned in elbow 12 and their ends properly spaced to permit the necessary relative movement due to expansion. The sections of liner element 17 may be held in their proper positions by any convenient temporary means. Insulation material 18 may then be applied to completely fill the space between the predetermined positions of rings 19 and the free ends of the sections. Rings 19 are next positioned and welded to their respective lining elements 17. Rings 24, when necessary, are then positioned and welded to the walls 14 after which the larger ends of rings 19 are welded to rings 24. The end spaces between rings 19 and the ends of their respective sections are then packed with insulation and rings 26 finally applied. Rings 29 are then positioned and welded to complete the assembly. In this construction pieces 23 are omitted as it is not possible to weld them in position, also, jackets 34 are omitted as they are not needed.

When vessel 10 is of a size too small to allow man access, the liner sections 16 are assembled and formed into a unit of the length of the section of the vessel externally of the vessel, with suitable linkages between sections to allow pulling them into the vessel and to allow proper expansion clearances between the sections. Such unit is then pulled through the vessel into position. Such unit will have but two rings 19, one at each end of the unit.

What is claimed is:

1. A vessel, an insulating lining positioned against the inner walls of said vessel, said lining including a depth of insulating material covering the inner walls of said vessel and a protective covering between said insulating material and the central space of said vessel, and impervious means surrounding said covering and united thereto and to the vessel walls, said impervious means preventing flow of the material handled through the space occupied by said insulating material and supporting said covering while permitting radial and longitudinal expansion thereof.

2. A vessel, an insulating lining positioned against the inner walls of said vessel, said lining including a depth of insulating material covering the inner walls of said vessel and a protective covering between said insulating material and the central space of said vessel, and an impervious diaphragm surrounding said covering and united thereto and to the vessel walls to provide an impermeable barrier to the flow of the material handled through the space occupied by said insulating material, said diaphragm maintaining said covering in position while permitting radial and longitudinal expansion thereof.

3. A vessel, an insulating lining positioned against the inner walls of said vessel, said lining including a depth of insulating material covering the inner walls of said vessel and a protective covering between said insulating material and the central space of said vessel, and a continuous annular member having sloping sides surrounding said covering and united thereto and to the vessel walls to provide a continuous barrier to the flow of the material handled through the space occupied by said insulating material, said annular member supporting said covering while permitting radial and longitudinal expansion thereof.

4. A vessel, an insulating lining positioned against the inner walls of said vessel, said lining including a depth of insulating material covering the inner walls of said vessel and a protective covering between said insulating material and the central space of said vessel, and an impervious frusto-conical diaphragm surrounding said covering and united thereto and to the walls of the vessel.

5. A vessel, an insulating lining positioned against the inner walls of said vessel, said lining including a depth of insulating material covering the inner walls of said vessel and a protective covering between said insulating material and the central space of said vessel, said insulating lining including a plurality of abutting sections, an impervious diaphragm surrounding the protective covering of each of said sections adjacent one end thereof and united thereto and to the vessel walls to provide a barrier to the passage of the material handled, said diaphragm supporting its section of the protective covering while permitting radial and longitudinal expansion thereof.

6. A vessel, an insulating lining positioned against the inner walls of said vessel, said lining including a depth of insulating material covering said inner walls and a metal liner between said insulating material and the central space of said vessel, said insulating lining being made up of a plurality of abutting sections, a generally frusto-conical metal diaphragm surrounding the metal liner section of each of said sections adjacent one end thereof and united thereto and to said walls to support said metal liner section while permitting radial and longitudinal expansion thereof, and means carried by the sections to maintain the sections in alignment during the expansion and contraction thereof.

7. A vessel, an insulating lining positioned against the inner walls of said vessel, said lining including a depth of insulating material covering said inner walls and a metal liner between said insulating material and the central space of said vessel, said insulating lining being made up of a plurality of abutting sections, an annular metal diaphragm having sloped sides surrounding the metal liner section of each of said insulating lining sections adjacent one end thereof and united thereto and to said walls to provide a barrier to the flow of the material handled through the space occupied by said insulating material, said metal diaphragms supporting their respective lining sections in any angular disposition thereof, said metal diaphragm permitting substantially unrestrained radial and longitudinal expansion of their respective metal liner sections.

8. A vessel, an insulating lining positioned against the inner walls of said vessel, said lining including a depth of insulating material covering said inner walls and a metal liner between said insulating material and the central space of said vessel, said insulating lining being made up of a plurality of abutting sections, an annular metal diaphragm having sloped sides surrounding the metal liner section of each of said sections of said lining adjacent one end thereof and united thereto and to said walls to support said section of said lining in any angular disposition thereof, said diaphragms permitting radial and longitudinal expansion of their respective metal liner sections, means at the ends of abutting metal liner sections maintaining said metal liner sections in alignment during expansion and contraction thereof, said alignment means restricting the flow path between metal liner sections to prevent substantial flow of said material handled into the space occupied by said insulating material while permitting sufficient flow of said material handled into said space to allow rapid pressure equilization.

9. A vessel, an insulating lining positioned against the inner walls of said vessel, said lining including a depth of insulating material covering said inner walls and a metal liner between said insulating material and the central space of said vessel, said insulating lining being made up of a plurality of abutting sections, an annular metal diaphragm having sloped sides surrounding the metal liner section of each of said lining sections adjacent one end thereof and united thereto and to said walls to support its respective section of said lining in any angular disposition thereof while permitting radial and longitudinal expansion of its respective metal liner section, and expansion joint means at the abutting ends of adjacent metal liner sections, said joint means including a lap ring telescoped within the abutting ends of the metal liner sections and united to the upstream one of the metal liner sections, said lap ring being of a width to seal the space between the metal liner sections in all positions thereof to substantial flow of the material handled while permitting rapid pressure equilization between the central space of said vessel and the space occupied by said insulating material.

10. A vessel, an insulating lining positioned against the inner walls of said vessel, said lining including a depth of insulating material covering said inner walls and a metal liner between said insulating material and the central space of said vessel, said insulating lining being made up of a plurality of abutting sections, an annular metal diaphragm having sloped sides surrounding the metal liner section of each of said lining sections adjacent one end thereof and united thereto and to said walls to support its respective section of said lining in any angular disposition thereof while permitting radial and longitudinal expansion of its respective metal liner section, and expansion joint means at the abutting ends of adjacent metal liner sections, said joint means including a lap ring telescoped within the abutting ends of the metal liner sections and a second lap ring surrounding the abutting ends of the metal liner sections, said rings being united to the upstream one of the metal liner sections and providing a groove into which extends the end of the downstream one of the metal liner sections, said first lap ring sealing the joint against substantial flow of the material handled into the space occupied by said insulating material while permitting rapid pressure equalization between the central space of said vessel and the space occupied by said insulating material.

11. A vessel, an insulating lining positioned against the inner walls of said vessel, said lining including a depth of insulating material covering said inner walls and a metal liner between said insulating material and the central space of said vessel, said insulating lining being made up of a plurality of abutting sections, an annular metal diaphragm having sloped sides surrounding the metal liner section of each of said lining sections adjacent one end thereof and united thereto and to said walls to support its respective section of said lining, while permitting radial and longitudinal expansion of its respective metal liner section, an expansion joint at the abutting ends of adjacent metal liner sections, and a support ring in the space between said joint and said vessel walls and between the insulating material of the abutting lining sections, said support ring being unconnected to said vessel walls, said joint and said metal liner sections whereby said support ring will not move relative to said insulating material during expansion and contraction of said lining sections.

12. A vessel, a protective lining between the central space of said vessel and the vessel walls, and impervious means surrounding said lining and united thereto and to the vessel walls, said impervious means preventing flow of the material handled in said vessel through the space between said lining and the vessel walls while permitting radial and longitudinal expansion thereof.

13. A vessel, a protective metal lining between the vessel walls and the central space of the vessel, and an impervious generally frusto-conical diaphragm surrounding said lining and united thereto and to the vessel walls to support said metal lining while permitting substantially radial and longitudinal expansion and contraction thereof.

ALBERT L. BAKER.
WILLIAM H. HILL.
ARTHUR R. C. MARKL.

REFERENCES CITED

The following references are of record in the file of this patent:

UNITED STATES PATENTS

| Number | Name | Date |
|---|---|---|
| Re. 8,214 | Moore | May 7, 1878 |
| 2,331,645 | Altorfer et al. | Oct. 12, 1943 |
| 2,348,754 | Ray | May 16, 1944 |